United States Patent
Daly et al.

(10) Patent No.: US 6,870,533 B2
(45) Date of Patent: Mar. 22, 2005

(54) INVALID SHAPE DETECTOR (ISD)

(75) Inventors: John M. Daly, Keller, TX (US);
Michael Friedman, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 249 days.

(21) Appl. No.: 10/035,111

(22) Filed: Dec. 27, 2001

(65) Prior Publication Data

US 2003/0122818 A1 Jul. 3, 2003

(51) Int. Cl.[7] .............................................. G06T 15/40
(52) U.S. Cl. ..................................... 345/421; 345/463
(58) Field of Search ................................. 345/421, 643

(56) References Cited

U.S. PATENT DOCUMENTS 5,347,619 A * 9/1994 Erb ............................. 345/426
6,549,201 B1 * 4/2003 Igarashi et al. ............. 345/423

OTHER PUBLICATIONS

Ian Garton. Ear Cutting for Simple Polygons. Last updated Dec. 10, 1997. pp. 1–5. cgm.cs.mcgill.ca/~godfried/teaching/cg–projects/ 97/Ian/cutting_ears.html.*

Dr. Jeffrey J. Glosper. Line Crossing Algorithm. Oct., 1998. pp. 1–4. www.brunel.ac.uk/~castjjg/java/crossed/crossed.html.*

Compiled with assistance from David H. Douglas and David M. Mark. Simple Algorithms I—Intersection of Lines. Last updated Aug. 30, 1997. pp. 1–6. www.geog.ubc.ca/courses/klink/gis.notes/ncgia/u32.html.*

* cited by examiner

Primary Examiner—Mark Zimmerman
Assistant Examiner—Adam Arnold
(74) Attorney, Agent, or Firm—J. Dennis Moore; W. James Brady, III; Frederick J. Telecky, Jr.

(57) ABSTRACT

A method to detect invalid polygons that are inputted by users using a graphical user-interface is presented. The method selects pairs of lines that are used to define the polygon and tests to determine if the lines crossover. If there are no crossovers, then the polygon is a valid polygon. If there is a pair of lines that do crossover one another, then the polygon is an invalid polygon. Such a method is useful in teaching polygons and their properties to novices and students.

8 Claims, 3 Drawing Sheets

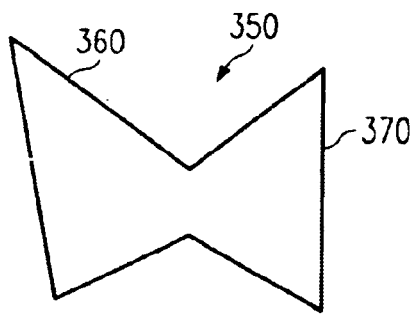
FIG. 3c
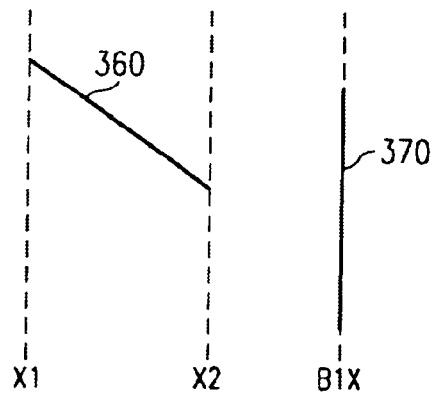
FIG. 3d
FIG. 4
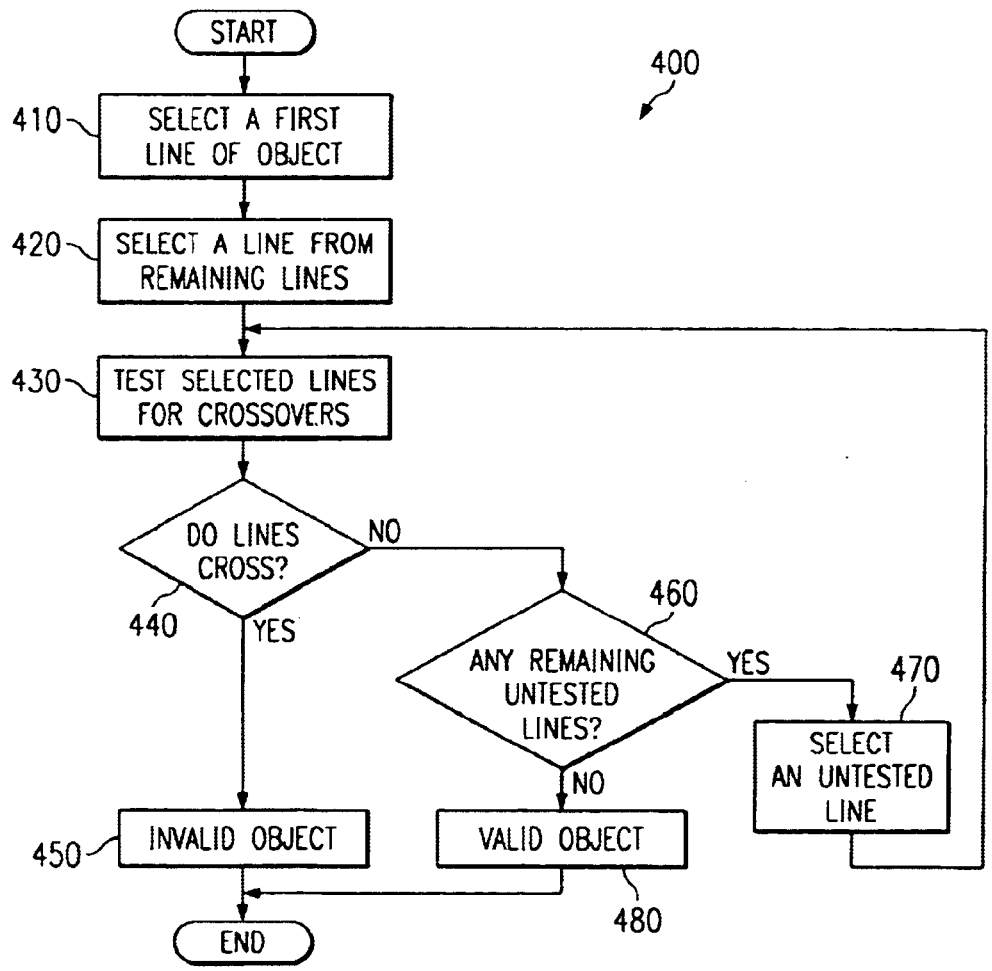

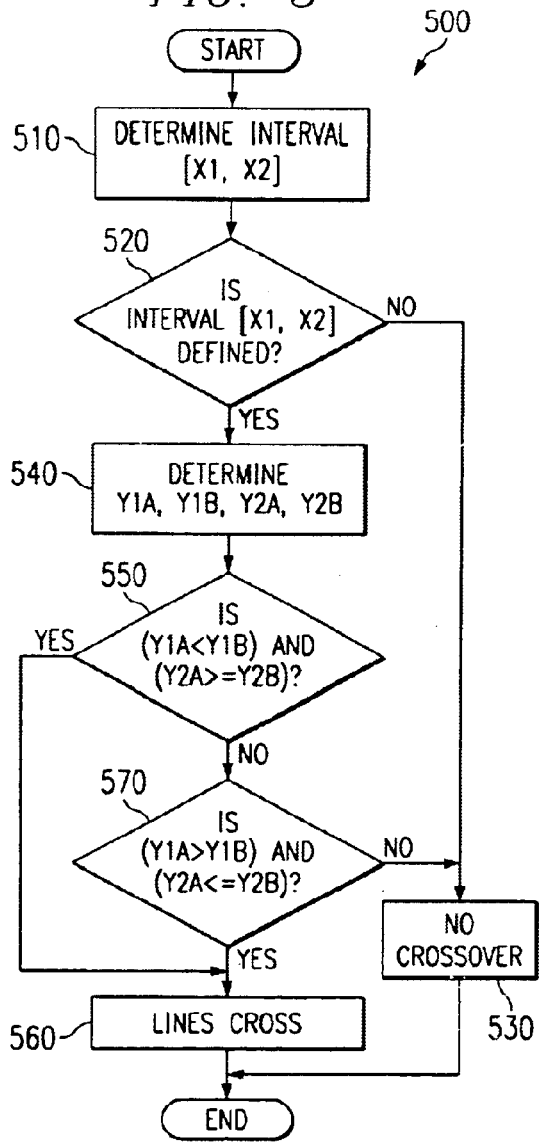
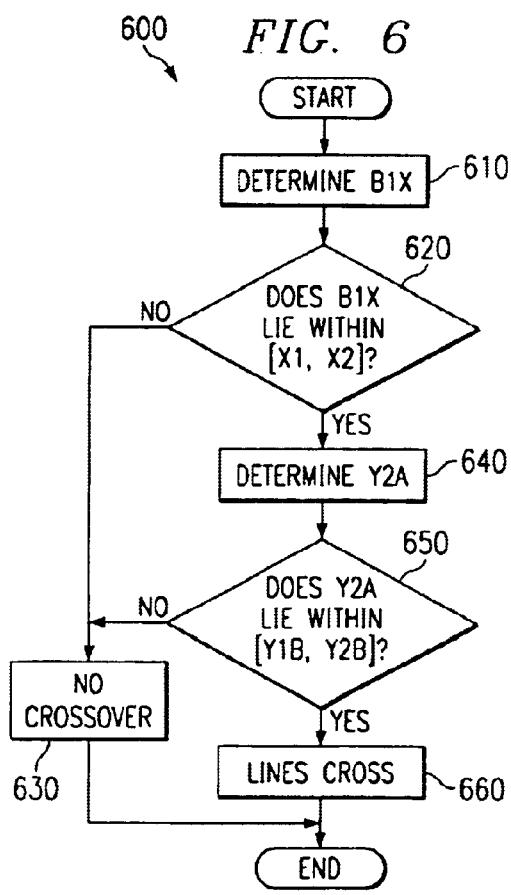

US 6,870,533 B2

INVALID SHAPE DETECTOR (ISD)

FIELD OF THE INVENTION

This invention relates generally to user interfaces, and particularly to examining user generated polygonal objects for invalid shapes.

BACKGROUND OF THE INVENTION

Graphical user-interfaces have permitted a significant number of users who are not familiar with the nuances involved in specifying geometric objects using a specification language to graphically enter such objects into a digital device such as a computer, calculator, personal digital assistant, etc. Using a stylus, mouse, or cursor keys, a user can draw a geometric object, such as a polygon, and have the object be entered into the digital device just as if the user had used a formal specification language to create the object.

After entering the object into the digital device, the user can use the digital device to determine information about the object such as the objects' dimensions, surface area, angles, arc lengths, and other physical properties. Such a device can be helpful in teaching people about geometric shapes and their properties.

However, by allowing freeform entry via a user interface, the system may be prone to errors. A user may not draw the object correctly and as a result, the digital device may not be able to calculate the properties of the object or worse, the digital device may inaccurately calculate the properties of the object. Because of the fact that the users of such devices tend to be novices or students, incorrect answers can rapidly erode their confidence in using the digital device.

A need has therefore arisen for a system that will detect an invalid polygonal object and notify the user that the object he has just drawn is invalid without complex error detection algorithms.

SUMMARY OF THE INVENTION

In one aspect, the present invention provides a method for detecting when two lines crossover one another comprising the steps of determining a starting and an ending point for each of the two lines, determining an overlap interval between the two lines and verifying the overlap interval's validity, calculating values for each line based on the overlap interval if the overlap interval is valid, comparing the calculated values and detecting line crossover based on the comparison.

In another aspect, the present invention provides a method for determining the validity of a polygon comprising the steps of selecting a pair of lines from a set of lines defining the polygon, determining if the pair of lines crossover, determining the validity of the polygon based on the crossover determination, and repeating for all remaining pairs of lines.

The present invention has several advantages. For example, use of a preferred embodiment of the present invention can detect the presence of an invalid polygon drawn by a user, using a simple line crossover algorithm that does not require a significant amount of memory or processing power.

Also, a preferred embodiment of the present invention permits an iterative approach to detecting the validity of the polygon. Rather than determining the validity of the polygon when the user completes drawing the polygon, a preferred embodiment of the present invention permits the validity of the polygon be checked after a new line is added (drawn). An iterative approach can reduce the overall computation time required to test for validity because each newly added line is tested with the lines previously drawn and none of the old lines need to be retested.

BRIEF DESCRIPTION OF THE DRAWINGS

The above features of the present invention will be more clearly understood from consideration of the following descriptions in connection with accompanying drawings in which:

FIGS. 3c and 3d illustrate a valid polygon with a line of undefined slope and the labeling of the lines used by a line crossover detection algorithm according to a preferred embodiment of the present invention;

FIG. 4 illustrates a valid polygon detection algorithm according to a preferred embodiment of the present invention;

FIG. 5 illustrates a line crossover detection algorithm where the lines under test both have defined slopes according to a preferred embodiment of the present invention; and FIG. 6 illustrates a line crossover detection algorithm where one of the lines under test has an undefined slope according to a preferred embodiment of the present invention.

DETAILED DESCRIPTION OF ILLUSTRATIVE EMBODIMENTS

Figure 1A:
FIGS. 1a–1d illustrate several different polygons, some of which are invalid, according to a preferred embodiment of the present invention.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Digital devices with an easy-to-use graphical user-interface have allowed many people who are not technically inclined the opportunity to make use of such devices to make their lives easier and more convenient. One area where such devices have made a significant impact is in the teaching field. Easy-to-use digital devices can assist teachers in presenting difficult concepts, allowing the students a hands-on learning experience and to progress at their own pace.

Mathematics, especially geometry, can be a particularly difficult subject for many young students. A well-designed digital device, such as a graphic calculator or personal digital assistant (PDA), can be used to teach geometry in a graphical fashion. However, to help increase confidence in the user in the device, the digital device must not provide incorrect answers since erroneous answers will reduce the user's trust in the digital device.

Basic geometry involves the study of shapes such as polygons and their physical properties such as surface area, perimeter, angles of intersecting lines, arc lengths, etc. A graphical user interface permits the users to draw the polygons on a screen rather than specifying the polygons using a complex description language. Examples of more complex mathematical computer applications include Mathematica and Matlab, which use formulas and equations rather than graphical user-interfaces to specify polygons. Once the polygons are drawn, a student can use the digital device to determine various physical properties of the polygon.

However, since the polygons are drawn freehand rather than being precisely defined, there is high probability of making mistakes. A common mistake for novice learners is the drawing of invalid polygons. Invalid polygons include polygons with lines that cross one another or polygons that are not closed.

Figure 1B:
Figure 1C:
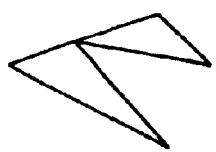
Figure 1D:
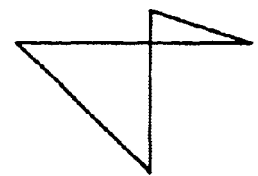

Referring now to FIGS. 1a–d, diagrams illustrate exemplary valid and invalid polygons according to a preferred embodiment of the present invention. A polygon is, by definition, a two-dimensional multi-sided object created by lines. A polygon is made up of at least three lines. FIGS. 1a and 1b illustrate valid polygons while FIGS. 1c and 1d illustrate invalid polygons. The polygons displayed in FIGS. 1c and 1d are invalid because there are intersecting lines in the polygon.

Calculating the physical properties, such as surface area, perimeter, etc. of an invalid polygon would result in an erroneous answer. For novice users and students, it is better to flag a polygon as being invalid and require them to make changes to the polygon than to present them with an erroneous calculation. Therefore, a method has been developed to detect an invalid polygon and to notify the user of their presence.

Figure 2A:
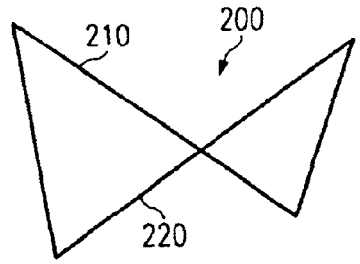
FIGS. 2a and 2b illustrate an invalid polygon, the pair of lines that cross, making the polygon invalid, and the labeling of the lines used by a line crossover detection algorithm according to a preferred embodiment of the present invention.

Referring to FIG. 2a, a diagram illustrating an invalid polygon 200 according to a preferred embodiment of the present invention. As discussed previously, the polygon 200 is an invalid polygon because two of its lines (210 and 220) intersect. Calculating physical properties for the polygon 200 would result in erroneous calculations, therefore, this polygon 200 needs to be detected as an invalid polygon by the digital device.

Figure 2B:
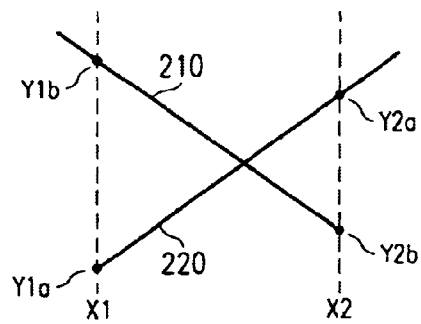

Referring now to FIG. 2b, a diagram illustrating the detection of the intersection of the two lines (210 and 220) in the invalid polygon displayed in FIG. 2a according to a preferred embodiment of the present invention. FIG. 2b displays the two intersecting lines (210 and 220) from FIG. 2a in the same scale and orientation as they are in FIG. 2a. According to a preferred embodiment of the present invention, the detection of the intersecting line involves determining if there exists any overlap along one axis (for example, the X-axis). If there is no overlap, then an intersection cannot occur.

Lines 210 and 220 do have an overlap along the X-axis. In FIG. 2b, the overlap is displayed using two dashed vertical lines, X1 and X2. From the overlap, Y-axis values corresponding to the vertical lines X1 and X2 are calculated for both lines 210 and 220. The Y-axis values are labeled Y1b and Y2b (for line 210) and Y1a and Y2a (for line 220). The Y-axis values are then used to determine if the lines intersect. The actual method used to determine the intersection will be discussed below.

Figure 2C:
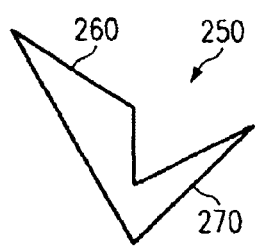
FIGS. 2c and 2d illustrate a valid polygon, an exemplary pair of lines used in the determination of the validity of the polygon, and the labeling of the lines used by a line crossover detection algorithm according to a preferred embodiment of the present invention.
Figure 2D:
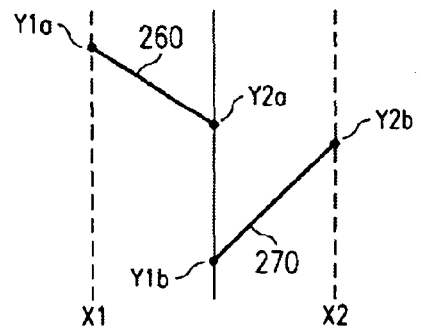

Referring now to FIGS. 2c and 2d, diagrams illustrate a valid polygon 250 (FIG. 2c) and an exemplary determination of a non-intersecting pair of lines 260 and 270 (FIG. 2d) according to a preferred embodiment of the present invention. The two lines 260 and 270 do not intersect each other since there is no overlap in one of the axis, the X-axis. Because no overlap exists, no intersection can occur. As long as no overlap occurs in one axis, no intersection between the two lines can occur.

A situation slightly different from the two above cases arises when one of the two lines being examined is a vertical line, i.e., the line has an undefined slope. If both of the lines have undefined slopes, then no intersection can occur. Because one of the lines is vertical, there is no overlap interval along the X-axis, only a single overlap point. The overlap point is X-value of the vertical line itself.

Figure 3A:
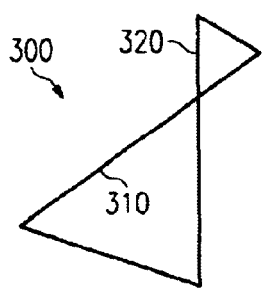
FIGS. 3a and 3b illustrate an invalid polygon with a line of undefined slope and the labeling of the lines used by a line crossover detection algorithm according to a preferred embodiment of the present invention.
Figure 3B:
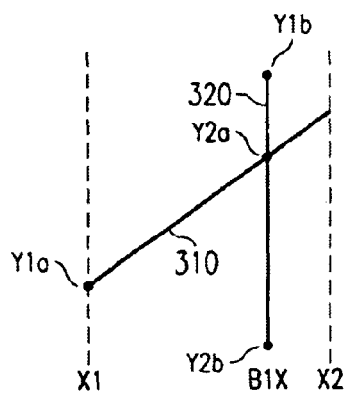

Referring now to FIGS. 3a and 3b, diagrams illustrate an invalid polygon 300 (FIG. 3a) with a vertical line 320 and an exemplary determination of an intersecting pair of lines 310 and 320 (FIG. 3b) according to a preferred embodiment of the present invention. FIG. 3b displays an overlap point, b1x, between lines 310 and 320. From the overlap point, b1x, a Y-axis value, Y2a, for the line with the defined slope corresponding to the overlap point, b1x, is calculated. The Y-axis value, Y2a, is used to determine if the two lines intersect. The actual method used to determine the intersection will be discussed below.

Referring now to FIGS. 3c and 3d, diagrams illustrate a valid polygon 350 (FIG. 3c) with a vertical line 370 and an exemplary determination of a non-intersecting pair of lines 360 and 370 according to a preferred embodiment of the present invention. The two lines 360 and 370 do not intersect each other since there is no overlap in one of the axis, for example, the X-axis. Because no overlap exists, no intersection can occur.

Referring now to FIG. 4, a flow diagram illustrates a valid polygon detection algorithm 400 for use in determining whether a polygon is valid or invalid according to a preferred embodiment of the present invention. The valid polygon algorithm 400 could be a part of a program executing on a digital device that is providing the teaching to the user. Alternatively, the valid polygon algorithm 400 could be a separate program executing on a digital device that is executed after the user enters a new portion to the polygon or when the user completes (or indicates that he has completed) the drawing of a polygon.

The digital device (under control of the valid polygon algorithm 400) begins by selecting a first line (block 410) of the polygon under test. There is no specific requirement on which line in the polygon is selected, and any line in the polygon is as good a choice as the next. This is due in part to the fact that all lines in the polygon will need to be checked against each other. If, however, the valid polygon algorithm 400 is executed after each new line is added to the polygon, then according to a preferred embodiment of the present invention, the newly added line would be the preferred selection as the first line. This is based on the assumption that as the lines are added to the polygon, they are checked and have all been found to be non-intersecting. With all previously added lines already checked, they will not be required to be rechecked against each other. Only the newly added line will need to be checked against the previously added lines.

After selecting the first line of the polygon under test, the digital device selects one of the remaining lines (block 420) in the polygon. According to a preferred embodiment of the present invention, any of the unselected lines in the polygon are candidates for selection with the exception of lines that share end-points with the selected first line. Lines that share common end-points are referred to as adjacent lines. The exclusion of adjacent lines from being selected is due to the fact that adjacent lines are by definition are going to intersect each other at the common points.

According to another preferred embodiment of the present invention, rather than selecting a first line and then one of the remaining lines, the digital device generates a list of pairs of lines to test. After generating the list of valid pairs, the digital device needs to only select a pair from the list when it wishes to perform a test.

After the second line is selected (block 420), the first line and the second lines are tested for crossovers (to see if they intersect) (block 430). The actual crossover detection algorithm will be discussed below. The result of the test is evaluated in block 440. If the lines cross, then the polygon is declared to be an invalid object (block 450). If the lines do not cross, the digital device checks to see if there is any other untested lines in the polygon (block 460). There are two types of untested lines. The first are lines that have not been tested against the first selected line and the second are lines other than the first selected line that have not been tested against the remaining lines in the polygon. Each valid pair of lines in the polygon must be tested to determine if the polygon is valid.

If there are lines that remain to be tested, then the digital device selects an untested line (block 470) or a new first line and second line comparison pair and tests the lines for crossover. If there are no more untested lines, then the polygon is a valid polygon (block 480) and the valid polygon algorithm 400 is complete. According to a preferred embodiment of the present invention, the digital device will warn the user if the user has inputted an invalid polygon. The digital device may highlight the lines that cross and allow the user an opportunity to fix the error. The digital device may also refuse any requests for calculations until the invalid polygon has been corrected.

As discussed previously, there are two different possible intersecting line scenarios that require slightly different processing in order to determine the validity of a polygon. The different scenarios involve the slope of the lines being tested. The scenarios involve lines that have a defined slope and lines that have an undefined slope. Lines that do not have a defined slope are lines that are vertical. The slope of a line can be defined as the vertical change divided by the horizontal change. A vertical line has no horizontal change, hence the slope of a vertical line is the vertical change divided by zero, or an undefined division. Two different algorithms are presented to handle the two different scenarios. The one used for a given line pair will depend on the slopes of the lines involved.

Referring now to FIG. 5, a flow diagram illustrates a line crossover-detecting algorithm 500 for lines with a defined slope according to a preferred embodiment of the present invention. The algorithm 500 is used when both lines being tested have defined slopes. The algorithm 500 would execute in a processor in the digital device and would be executed in block 430 of the valid polygon detection algorithm 400 discussed in FIG. 4.

The digital device begins by determining an overlap interval between the two lines (block 510). An overlap interval is defined as being an interval along a single axis (the axis may be either the X- or the Y-axis, but according to a preferred embodiment of the present invention, the axis of choice will be the X-axis) that is common to both lines being tested. The start of the interval is referred to as point X1 and the end of the interval is referred to as point X2 (FIG. 2b provides a good example of the overlap interval). The digital device checks to see if an overlap interval exists (block 520). If an overlap interval does not exist, then the two lines cannot overlap and there is no crossover (block 530).

If an overlap interval does exist, then the digital device will calculate the Y-values for each of the two lines being tested corresponding to the points X-values at X1 and X2 (block 540). For a first line the Y-values are referred to as Y1a and Y1b, while for a second line the Y-values are referred to as Y2a and Y2b. After determining the Y-values of the two lines corresponding to the points X1 and X2, the digital device uses the Y-values to calculate if the two lines cross within the overlap interval. The determination if the two lines cross involves the evaluation of two expressions. A first expression: $((Y1a \leqq Y1b)$ and $(Y2a \geqq Y2b))$ evaluated in block 550 checks to see if the first line initially started (at point X1) being equal to or less than the second line and then ended up (at point X2) being equal to or greater than the second line. If the first expression evaluates true, then the lines cross. A second expression: $((Y1a \geqq Y1b)$ and $(Y2a \leqq Y2b))$ evaluated in block 570 is an analogue to the first expression. The second expression checks to see if the first line started (at point X1) being greater than or equal to the second line and then ended up (at point X2) being less than or equal to the second line. Again, if the second expression evaluates true, then the lines cross. If either the first expression or the second expression evaluates to true, then the lines cross. If both expressions evaluate to false, then the lines do not cross (block 530).

After evaluating the expressions, the algorithm 500 may set a specified memory location to a value corresponding to whether or not the lines cross. Alternatively, the algorithm 500 may cause the processor to assert a line crossover signal flag line or an interrupt. Regardless of how the algorithm 500 lets the valid polygon detection algorithm 400 know the results of the evaluation, the results of the evaluation are used by the valid polygon detection algorithm 400 to assess the validity of the polygon under test.

Referring now to FIG. 6, a flow diagram illustrates an algorithm 600 for detecting line crossovers where one of the lines has an undefined slope according to a preferred embodiment of the present invention. A situation where both lines have undefined slopes may arise, but by definition, the two lines can never cross unless they share a common X-value, therefore the situation need not be tested. Two vertical lines sharing a common X-value can be the result of two possible scenarios. A first scenario involves the first line sharing a common starting or ending point with the second line. This is in fact a single vertical line and the digital device treats it as such. A second scenario involves a first line sharing more than a single common point with the second line. This is classified as an invalid line and according to a preferred embodiment of the present invention, the digital device would not let the user input such a line.

During the selection of a line for testing, the digital device can easily detect that a line has an undefined slope if both its starting and ending points have the same X-value. If this is the case, then the digital device shall use a different crossover detection algorithm than if both lines had defined slopes.

The digital device begins by determining the X-value, b1x, of the line with undefined slope (block 610). The X-value, b1x, is simply the X-value of either the starting or ending point of the line (both the starting and the ending points have the same X-value). After determining the X-value, b1x, the digital device compares the X-value, b1x, with the second line being tested. The digital device determines if the X-value, b1x, lies within an interval ([X1, X2]) defined by the X-values of the starting and ending points of the second line (block 620). If the X-value, b1x, does not lie within the interval, [X1, X2], then there is no crossover.

If the X-value, b1x, does lie within the interval, [X1, X2], then the digital device will calculate the Y-value, Y2a, of the second line corresponding to the X-value, b1x (block 640). This is the value of the second line at the X-value, b1x. The digital device then will compare the Y-value, Y2a, with another interval, [Y1b, Y2b], to determine if Y2a lies within that interval (block 650). The starting and ending points of the interval [Y1b, Y2b] are the Y-values of the starting and ending points of the line with undefined slope. If Y2a does not lie within in the interval [Y1b, Y2b], then there is no crossover (block 630). However, if Y2a does lie within the interval [Y1b, Y2b], then there is a crossover (block 660).

The above relationships can be expressed using a mathematical expression as well. If the expression: $((b1x \geq X1)$ and $(b1x \leq X2))$ and $((Y1b \geq Y2a)$ and $(Y2b \leq Y2a))$ evaluate to true, then the lines cross and the polygon is invalid. If either or one of the expressions evaluate to false, then the lines do not cross.

After evaluating the expressions, the algorithm 600 may set a specified memory location to a value corresponding to whether or not the lines cross. Alternatively, the algorithm 600 may cause the processor to assert a line crossover signal flag line or an interrupt. Regardless of how the algorithm 500 lets the valid polygon detection algorithm 400 know the results of the evaluation, the results of the evaluation are used by the valid polygon detection algorithm 400 to assess the validity of the polygon under test.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for detecting an invalid polygon on a handheld computer device comprising:

(a) inputting from a user on a graphical interface a plurality of connected lines to define a polygon;
    (b) selecting a pair of lines from the plurality of lines that do not share a common starting point;
    (c) determining if the selected pair of lines crossover;
    (d) determining the polygon is invalid and indicating to the invalidity to the user if the selected pair of lines crossover; and
    (e) repeating steps (a)–(c) for remaining pairs of lines from the set of lines, wherein the determining line crossover step comprises:
    determining a starting and ending point for each line in the pair of lines;
    determining an overlap interval;
    determining if the overlap interval is a valid interval;
    calculating a value for each line based on the overlap interval if the overlap interval is valid;
    comparing the values for each line if the overlap interval is valid; and
    detecting line crossover based on the comparison if the overlap interval is valid.

2. The method of claim 1, wherein the set of lines is a set of all possible combination of pairs of lines in the polygon.

3. The method of claim 1, wherein the validity of a polygon is tested after a new line is added to the polygon and before the user completes drawing the polygon.

4. The method of claim 1, wherein the validity of a polygon is tested after it has been completely specified.

5. The method of claim 1, wherein the validity of a polygon is tested only after a user specifies that it be tested.

6. The method of claim 1, wherein the overlap interval is defined as [X1, X2], and wherein the calculating step comprises calculating an Y-value for each line at the beginning of the overlap interval, X1, and an Y-value for each line at the end of the overlap interval, X2.

7. The method of claim 6, wherein a point on each line each line is specified by an X-value and a Y-value, and wherein the comparing step comprises:

comparing the Y-value at X1 (Y1a) for a first line with the Y-value at X1 (Y1b) for a second line; and
    comparing the Y-value at X2 (Y2a) for the first line with the Y-value at X2 (Y2b) for the second line.

8. The method of claim 7, wherein a line crossover has occurred if $((Y1a \leq Y1b)$ and $(Y2a \geq Y2b))$ or $((Y1a \geq Y1b)$ and $(Y2a \leq Y2b))$ evaluate true.

* * * * *